March 23, 1943. C. HALL ET AL 2,314,494
WASHER PLACING MACHINE
Filed Feb. 27, 1941 4 Sheets-Sheet 1

Inventors
Carlos Hall &
Fernando Hall
By Christian R. Nielsen
Attorney

March 23, 1943.  C. HALL ET AL  2,314,494
WASHER PLACING MACHINE
Filed Feb. 27, 1941  4 Sheets-Sheet 2
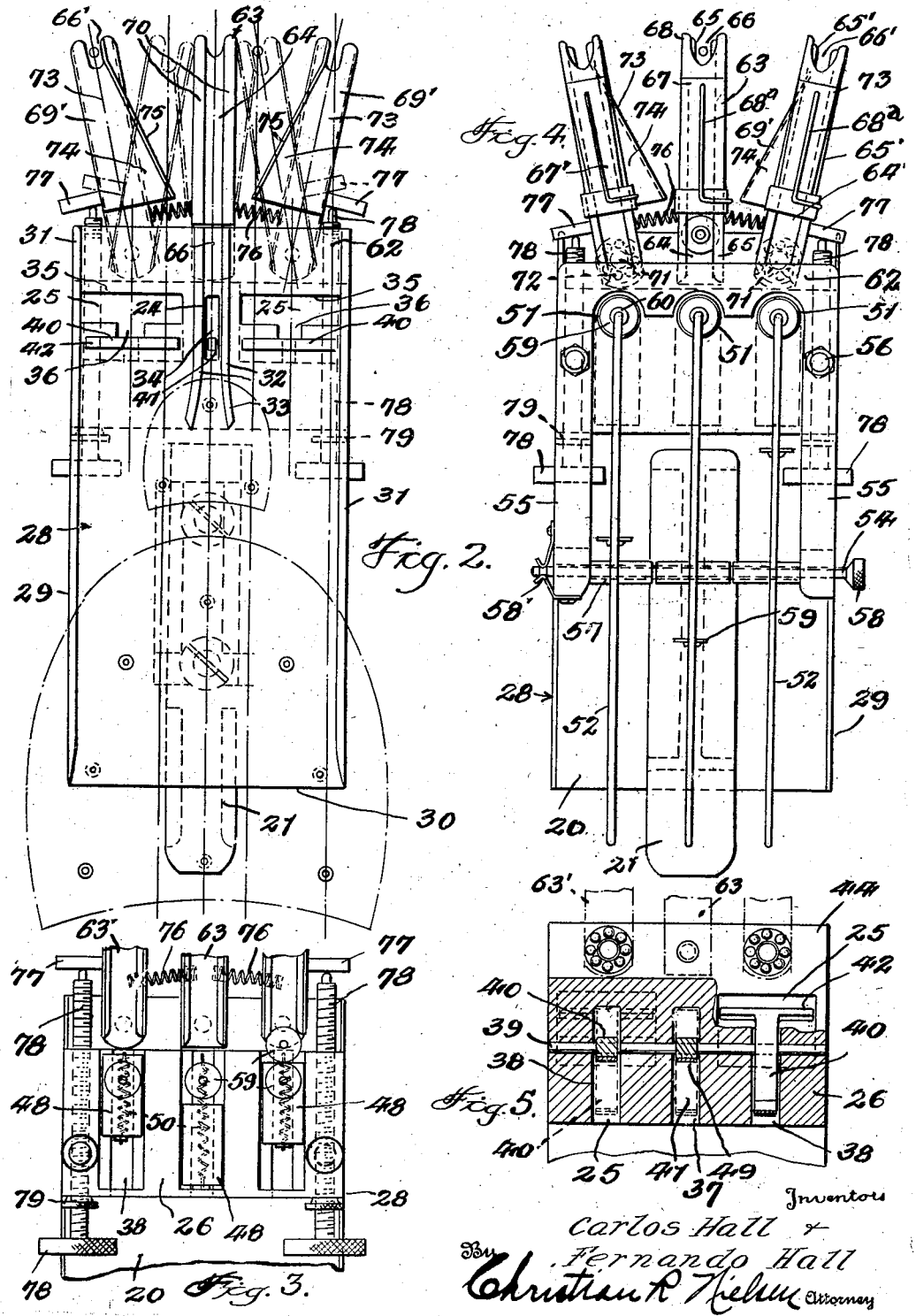
Inventors
Carlos Hall &
Fernando Hall
By Christian R. Nielsen Attorney

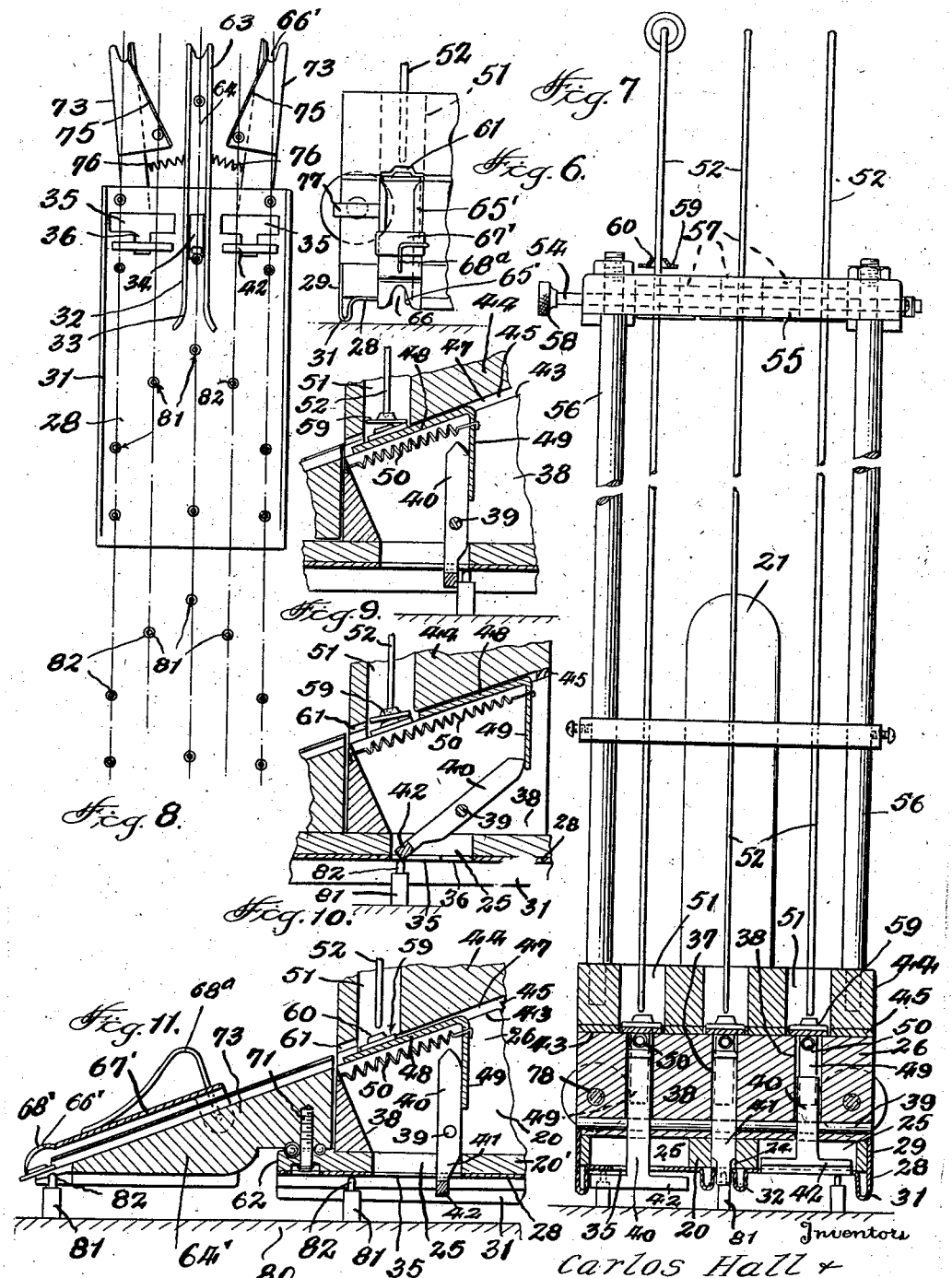

March 23, 1943.  C. HALL ET AL  2,314,494
WASHER PLACING MACHINE
Filed Feb. 27, 1941  4 Sheets-Sheet 4
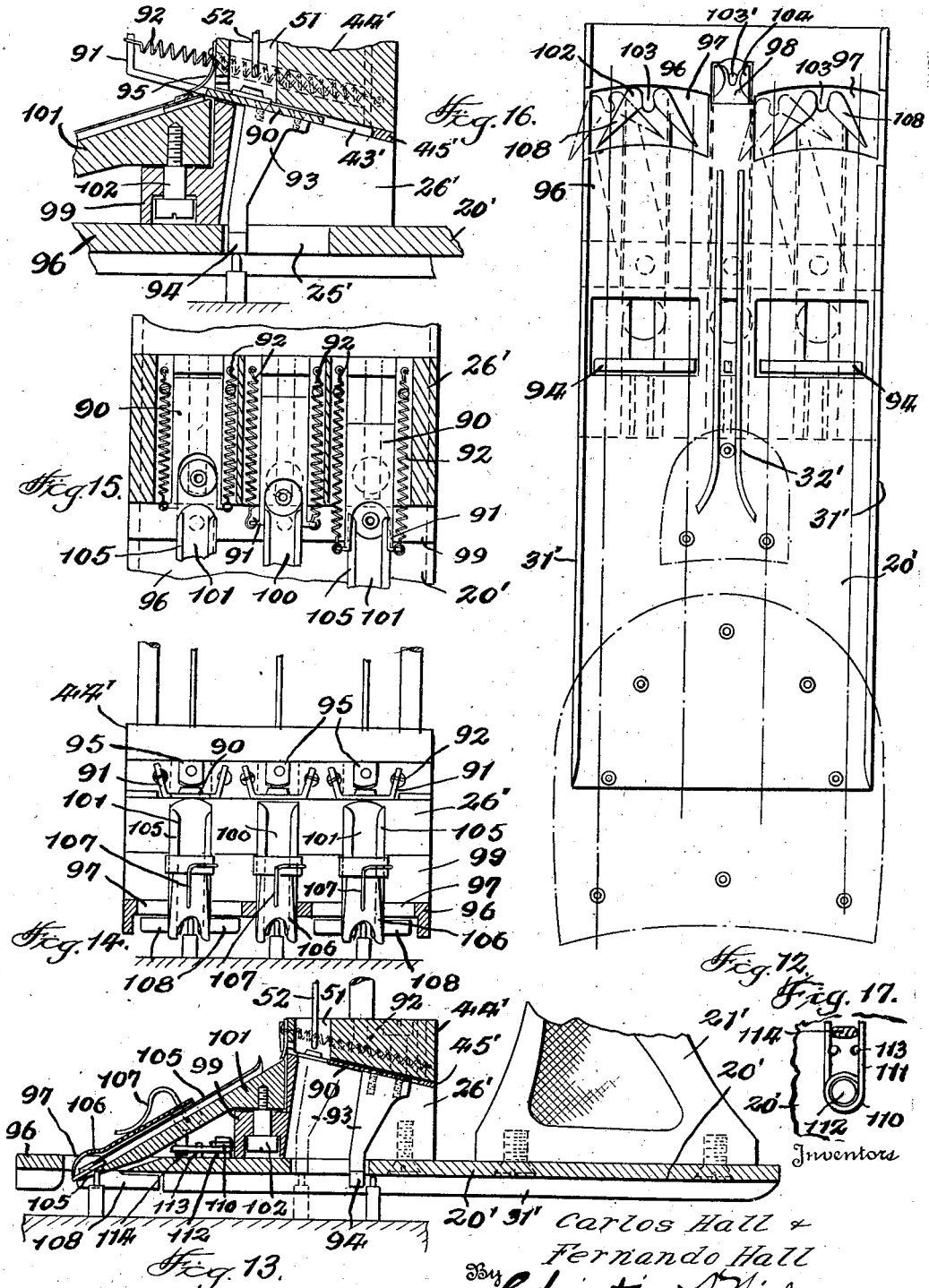
Inventors
Carlos Hall &
Fernando Hall
By Christian L. Nielsen
Attorney Patented Mar. 23, 1943

2,314,494

UNITED STATES PATENT OFFICE 2,314,494

WASHER PLACING MACHINE

Carlos Hall and Fernando Hall, Mexico City, Mexico, assignors of twenty-five per cent to Harry Hadfield Hallatt and twenty-five per cent to Oscar Antonio Chabrand, both of Mexico City, Mexico Application February 27, 1941, Serial No. 380,947

6 Claims. (Cl. 18—1)

The invention relates to a machine for placing washers on studs automatically, and particularly to such a machine specially adapted for placing washers on pins of molds for the vulcanization of rubber heels. It has for an object to enable the production of a simple machine of this type which will operate automatically to place washers upon the studs of rubber heel molds, and particularly to enable its production in a small size so that it may be embodied as a portable hand-operated and supported machine adapted to be rested upon the molds as conventionally constructed and utilized in rubber heel manufacture, so that passage of the washer placing machine over the molds, or movement of the molds under the washer placing machine will cause the deposit of the washers upon the pins of the mold as they pass under the machine. Another important aim of the invention is to present such a machine which will be entirely automatic and will require no individual manipulation by the operator of washer feeding or releasing devices, but will require only the movement relatively of the machine and pin devices upon which the washers are to be placed.

A further important aim of the invention is to present such a device which will operate with equal efficiency upon large and small groups of pins, as might be involved in molds for large heels and small heels, and which will automatically accommodate itself to various spacings and number of pins within a given area without requiring special adjustment of the machine, or specific efforts on the part of the operator, except to maintain the relative movement of the machine and pin group in a particular direction in a given path, or at least so that the relative movement is in a rectilinear path in a given relation to the machine.

Another important aim of the invention is to present a novel washer supply device peculiarly adapted to carry a maximum number of washers in a small hand-operated machine and to feed these to the placing mechanism in a highly effective, efficient way.

Another important aim of the invention is to present a novel means for discharging washers from the machine in response to the passage of pins upon which washers are to be placed, and to present a novel device for effecting engagement of the washers upon pins as they pass under the machine.

Another important aim of the invention is to present such a machine which will be liable in a minimum degree to derangement the use involved, and which will be extremely durable and reasonable in cost. It is a further specific aim of the invention to present a novel construction enabling the renewal of wearing parts at a minimum of expense, and to present a device which may be readily serviced without highly trained mechanics or expensive machinery.

Additional objects, advantages and features of invention reside in the construction, arrangement and combination of parts involved in the embodiment of the machine, as will be understood from the following description and accompanying drawings, wherein Figure 1 is a vertical section of the complete apparatus in a plane longitudinally and medially of the path of relative movement of the machine and molds when in use, and showing a portion of the molds in operative relation thereto, Figure 2 is a bottom view of the machine, the automatic spacing adaptation of the washer guide being indicated in dotted lines.

Figure 3 is a fragmentary horizontal sectional view of the washer discharging device.

Figure 4 is a top view of the machine.

Figure 5 is a fragmentary horizontal section on the line 5—5 of Figure 1, showing the ball bearing mounting of the washer guide.

Figure 6 is a fragmentary front elevation showing one of the washer guide units.

Figure 7 is a vertical cross section of the machine at the washer feed needle, looking toward the rear of the machine.

Figure 8 is a schematic plan of the apparatus and a series of steel molds, showing the relation of the molds to the machine when in operation.

Figures 9, 10 and 11, are fragmentary vertical sections in the same plane as Figure 1, but enlarged, and showing successive stages of operation of the trigger and washer discharge devices, Figure 12 is a view like Figure 2, showing a modification of the device.

Figures 13, 14, 15 and 16 are fragmentary views of the modification, corresponding to Figures 1, 6, 3 and 10, respectively.

Figure 17 is a fragmentary top plan view, partly in section, illustrating a pivoted guide centering device employed in the modified form of the device.

Figure 1:
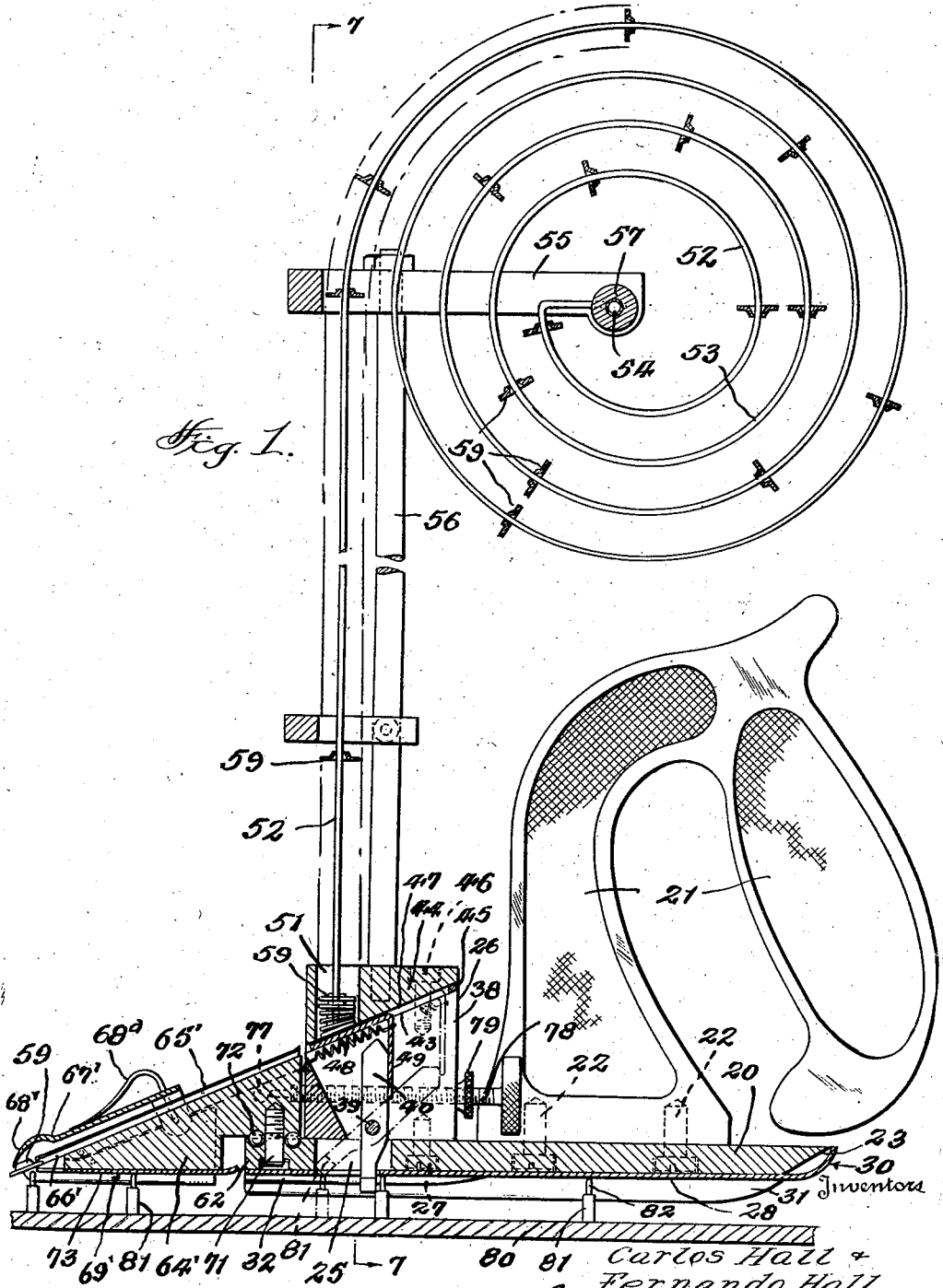

Referring now particularly to the drawings, there is illustrated a machine which is slightly smaller in its body part than the ordinary hand iron or flat-iron used in ironing clothes and the like, and consists of a planiform bed plate 20, upon the upper side of which there is secured a handle or hand grip 21, secured on the upper side of the plate by means of counter-sunk screws 22 engaged through the under side of the plate. This plate is substantially rectangular in plan, and slightly elongated longitudinally of the machine, its rear edge being bevelled on the lower side, as at 23.

It should be noted that the machine as illustrated in Figure 1, is approximately the actual size of the machine as put into use, and the same is true of other views which represent the parts in the same proportions. On the forward part of the plate 20, a central narrow slot 24 is formed through the plate from bottom to top, this slot being elongated longitudinally of the machine, as may be seen in Figure 2. On each side of this slot, there are wide slots 25, of the same dimensions as the slot 24 longitudinally of the machine, but being six or more times the width of the slot 24, as may also be seen in Figure 2 and Figure 7. Fixed on top of the plate 20, and extending over the slots 24 and 25, there is an assembly frame block 26, held removably on the plate by means of screws 27. The plate 20 extends a short distance forwardly beyond the block 26, to afford a mounting for a central fixed and two lateral washer placing guides, as will be subsequently described.

The bed plate 20 is provided with a renewable lower section or wear-plate 28, formed of sheet steel pressed to form and hardened, and which may be termed a shoe. It has upwardly extending flanges 29 which may be secured to the sides of the plate 20, and is curved upwardly at its rear edge, over the bevelled face 23 of the bedplate, as at 30, the curvature being sufficiently gradual so that when the device is moved rearwardly over molds, the pins of the molds will not so engage the device as to check movement of the molds thereunder. The forward end of the plate 28 stops flush with the forward end of the plate 20. On each side closely adjacent the lateral edges of the plate 20, the plate 28 is formed with guide ribs 31 extending downwardly, and extending over the major length of the plate 20, the flanges 29 being formed as flush continuations of the outer side of the ribs 31, which are quite narrow. Centrally of the plate 28 two laterally spaced longitudinal ribs 32 are formed, extending from the front edge of the plate 28 for a short distance rearwardly of the slots 25 and 24, and these central ribs diverge from each other at their rear ends, as may be seen in Figures 2 and 8. The ribs 32 are located close beside the central slot 24, and the slots 25 have their inner sides close to the ribs respectively, as shown. The ribs 31 and 32 extend full height to the forward end of the plate 28, but the ribs 32 are of slightly less elevation than the ribs 31. The plate 28 is also formed with a central longitudinal slot 34, and lateral wider slots 35, which underlie the slots 24 and 25, respectively, although the slots 35 are of somewhat less dimension longitudinally of the device than the slots 25, but the slots 35 have rearward central extensions 36, so that the lateral slots in the plate 28 are substantially T-shaped. The forward wide parts of the slots 35 stop short of the rearward sides of the slots 25, while the rear parts of the extensions 36 stop under the rear sides of the slots 25. The assembly or frame block 26 is formed with an inclined flat surface 43 which slopes downwardly toward the front of the device, as may be seen in Figure 1, and formed through the block from top to bottom there are similar laterally spaced slots 37 and 38 extending from near the forward side of the block rearwardly, and opening through its rear side, as shown, each of these slots being the same width as the central slot 24 in the plate 20. The central one of these last named slots, indicated at 37, is alined with the central slot 24 while the lateral slots through the block 26 are located intermediately of the widths of the respective slots 25 thereunder in the plate 20. A transverse pivot shaft 39 is fixed in the block 26 near its bottom surface, and extending through the slots 37 and 38, on a line over the rear parts of the slots 24 and 25, as may be seen in Figures 1 and 7, and Figure 5.

Pivoted on this shaft, there are two lateral triggers 40, and a central trigger 41, consisting of levers fitted for oscillation in the respective slots 37 and 38. The lower end of the lever 41 is narrowed sufficiently to oscillate in the slot 34 of the shoe 28, being extended a distance below the under surface of the plate 20, while the levers 40 are extended through the slots 25 and 35, and provided with broadened heads 42 which are the full width of the broad portions of the slots 25, and are adapted to extend below the plate 20 the same distance as the lower end of the trigger lever 41, or slightly further, if desired, as shown in Figures 1 and 7. The head portions 42 are adapted to swing upwardly through the wide parts of the slots 35 and into the slots 25 a distance, as indicated in Figure 1 and at the right in Figure 7. The upper ends of the trigger levers extend upwardly so that when the lower parts are at the rear limit of their movement, as shown in Figure 1, and at the left in Figure 7, their upper ends stop short of the upper inclined face 43 of the frame block 26. A cap block 44 is secured upon the upper side of the frame block 26, this cap block having its lower side inclined to correspond with the upper side of the block 26, and having a horizontal top side. A spacer plate 45 is interposed between the blocks 26 and 44, the cap block being secured upon the frame block by means of screws 46 countersunk in the top side of the cap block and extending through the spacer 45, as shown. The spacer is formed with slots 47 therein, symmetrically disposed with respect to the slots 37 and 38, being slightly wider than the latter slot, and corresponding in width to the diameter of the washers which are to be placed by the machine, so that such a washer may slide freely in the slots 47 between the blocks 26 and 44. Slidable in respective slots 47, there are plunger ejector plates 48, formed of hard sheet metal and having operating tongues 49 of less width, bent downwardly and extended rectilinearly and vertically into respective slots 37 or 38, as the case may be, the tongues 49 extending a distance below the upper ends of the trigger levers. The upper ends of the trigger levers stop short of the top side 43 of the frame block sufficiently to permit a contractile, helical spring 50 to be anchored at the forward side of each slot 37 and 38, and extended rearwardly and attached to the respective depending arm 49 of the ejector plate at its extreme upper part, being under tension tending to hold the ejector plate at the forward limit of its movement with the arm 49 pressed against the lever 40. The movement of the lever 40 is checked by engagement of its lower part against the rear edge of the respective slot 24 or 25, as the case may be, or the rear edge of the slot 34 or 35, at which time the lever 40 will be in vertical position, and the forward end of the ejector plate will be close to the forward side of the frame block 26. Operation of the trigger 40 to the position dotted in Figure 1, will result in retraction of the ejector plate to a rear position as dotted in Figure 1, and within the range of movement of the forward edge of the plunger as thus defined, there is formed in the cap block 44 over each of the slots 47 a circular well opening 51, this well being located somewhat to the rear of the front face of the cap block, and extending vertically therein and opening into the respective slots 47 of the spacer plate 45. Each well 51 is of a diameter corresponding to the width of the slot 47.

A washer feeding device is mounted on the block 44, consisting of a hardened steel needle wire 52 having a rectilinear portion extending vertically from the well 51, there being one of these wires for each of the three wells, as shown. The wire extends vertically a substantial distance above the handle 21, and there formed into a flat spiral or vermiform device with its convolutions equally spaced, its extremity at the inner part of this vermiform being fixed removably upon a cross shaft 54, carried upon bracket arms 55, which are supported by standards 56 fixed in the cap block 44. In order to enable ready removal and replacement of the wire unit by others, newly loaded with washers, the shaft 54 is made removable, and each wire is fixed upon a hub 57, as may be seen in Figures 1 and 7. The three wires may be fixed upon a single hub, or may be fixed upon respective individual hubs of shorter length, which may be clamped between the arms 55 by forming the shaft 54 with threads at one end screwed into one bracket, and a knurled head 58 at the other, for manipulation, or a snap fastening 58' may be employed.

The lower ends of the wires 52 stop short of the respective slots 47, so that washers introduced into the well 51 upon each or respective wire, may pass freely from the wells through the slot 47. Owing to the shape of washers used for specific purpose indicated, viz., use in rubber heels, and as these washers, indicated at 59, have a central raised portion 60, the cap block 44 is formed with a slot 61, over each slot 47 at the lower part, and extending from the respective well 51 through the front face of the block. The wires 52 are intended to be engaged or threaded through a multiplicity of washers, functioning very much as a needle, the washers being packed upon the wire so that they are in close relation throughout the spiral and the rectilinear portion leading into the well 51, this number of washers not shown, but being indicated by dotted lines as a convenient method of illustration. In this way there will be a solid column of washers extending from the ejector plate upwardly through the wall and continuing throughout the length of the spiral, when a freshly loaded supply wire is put in position. When the ejector plate 48 is moved rearwardly, by one of the triggers or otherwise, so as to clear the adjacent well, a single washer may fall into position in the slot 47 in advance of the ejector, the slot being of just sufficient size to permit a single washer to lie therein. The boss 60, on such washer dropped into the slot 47 will be still engaged in the recess side of the next washer thereabove, and so will be held against dropping from the slot 47 until the ejector moves forwardly so as to press it outwardly from the slot 47.

It will be noted that the forward side of the frame block 26 stops short of the forward end of the bed plate 20, affording a projecting ledge part 62, and fixed on this projecting part at the middle, there is a central washer guide device 63. This consists of a block 64 suitably shaped at the under side to rest upon the forwardly projecting ledge, and having an upper inclined side alined with the top side of the block 26 and in line with the respective central groove or slot 47, so as to receive a washer thereover when ejected from the slot 47. Fixed on the sides of the block 64 there are thin sheet metal retainer flanges 65 extending inwardly over the block 64 in spaced relation thereto so as to receive the extreme edge portions of a washer thereunder slidably, so that the latter may move downwardly over the block 64 to the forward extremity thereof. The guide flanges 65 extend beyond the forward end of the block 64, as indicated, and the bottom face of the block 64 at its forward part may be extended downwardly and finished in a plane coincident with the plane in which the under face of the bed plate 20 is formed. The forward extremity of the block 64 is slotted, as at 66, and the guide flange 65 extended over this slotted portion and stopping short of the intersection of a geometrical section of the guide flange and the under surface of the block 64. In addition, there is provided over the guide flanges 65 at the outer end of the particular guide device, a pivoted retainer finger 67, having a downturned extremity 68, adapted to lie normally in line with the path of washers moving downwardly between the block 64 and the guide flanges 65, and being yieldably held in such retaining position by means of a leaf spring or the like 68—a. A shoe plate or wear plate 69 is attached to the under side of the block 64, slotted at its forward end to conform to the slot 66, and having ribs 70 formed on its under side, which may aline with the ribs 32 on the shoe plate 28. The retaining finger 67 is yieldable to a washer held thereunder, when sufficient force is applied to the washer, tending to force it longitudinally outward from the machine, and the finger will then spring back to retaining place after a washer has been so passed thereunder.

At each side of the rigid guide device 63, there are pivoted guide devices 73, each of which may comprise parts the same as those described in the rigid guide, with the exception of the manner of mounting of these pivoted guides upon the ledge 62, and with respect to the form of the shoe plate thereunder. Parts in the pivoted guide corresponding to those of the fixed guide are indicated by the same reference characters with the addition of a prime mark, as may be seen. Instead of the body block 64' being fixed rigidly upon the ledge 62, a pivot pin 71 is engaged through the ledge 62 from the under side, and screwed into the overlying portion of the block 64', the pin having a head disposed in a recess in the under side of the ledge 62, and a groove being formed in the opposed faces of the block and the ledge, in which balls 72 are engaged, forming an anti-friction pivot for the block. The shoe plate 69' on the pivoted block instead of being formed with parallel ribs 70, are shaped as simple planiform plates suitably fixed on the under side of the block 64' and being broadened in the direction of the pivot of the block, so as to extend laterally of the block a considerable distance, as may be seen in Figure 2, this lateral extension in each instance being only toward the inner side of the block and toward the medial, vertical plane of the device, as shown at 74, and no flange or rib is formed on the under side of this shoe plate at the lateral outer side thereof, but on the diagonal edge or inner side, of the shoe plate, a depending flange 75 is formed extending downwardly a distance corresponding to the depth of the rib 31 or ribs 32, or rib 70, as found desirable, this rib 75 extending inwardly and forwardly toward the medial radius of the pivoted guide device and to a point beside the slot 66' at the inner part thereof, and thence being continued in alinement with the adjacent edge of this slot to the extremity of the pivoted device, or parallel to the medial radius thereof. The shoe plate 69' as indicated, is planiform throughout, except for the flange 75 depending at its diagonal inner side, and extends rearwardly on the pivoted guide to within a short distance of the forward end of the plate 20 and shoe 28. The lateral inward extension 74 extends toward the stationary guide 63 and stops short thereof a short distance sufficient to permit lateral movement of the pivoted guide. Protractile, helical springs 76 are confined between the stationary guide 63 and the pivoted guides at each side so as to hold the pivoted guides inclined diagonally outward to the limit of their movement in that direction. Such movement is limited by the provision of a lateral lug or pin 77 on each of the pivoted guides, this being fixed in the body of the block 64'. Adjustable stop screws 78 are engaged longitudinally through the frame block 26 at the extreme side of the device, these screws extending longitudinally through the frame block 26 at the extreme side of the device, these screws extending longitudinally of the machine on a level with the stop arms 77 and arranged so that the forward ends of the screws engage against the rear sides of these arms to stop lateral swinging movement of the pivoted guide. A lock nut 79 is provided on each screw 78 to hold it in adjusted positions, so that the outer position of the pivoted guide may be adjusted satisfactorily.

In the use of this machine as thus constructed, a series of the needle wires 52 being properly loaded and mounted on the machine, each of the wells 51 will then have a series of washers 59 standing in a column therein, substantially as indicated in Figure 1, and extending upward onto the needle wire 52, and continuing in close relation thereto to the inner end of the helix, and ejector mechanisms will be substantially in the position shown in dotted lines in Figures 1, 9 and 11, the column of washers resting on top of the ejector 48. The machine is now positioned over a line of molds or the like having pins upon which the washers are to be engaged. The mold device is formally represented at 80, in Figure 1, no attempt being made to show the details of the mold, and on this there are set a multiplicity of pins 81, having reduced tenons 82 at their upper ends, intended to engage through the apertures in washers 59 so that the washers will rest on the upper ends of the pins around the base of the tenon, and so be supported above the level of the bottom of the bowl. In this arrangement, it will be noted that the pins and tenons 81 and 82 project upwardly sufficiently to support the machine, by resting slidably against the shoe plates. If the mold is in a series of moving elements, our machine may be held stationary thereover, but if the molds are stationary, the machine is positioned thereover and drawn rearwardly or toward the right, as viewed in Figure 14. In either case, the pin moving relatively to the machine and forwardly in engagement with the wear plate 28, will pass thereunder, either between the ribs 32, or between a rib 32 and the adjacent rib 31, according to the positions of the pins as they pass under the machine. In the case of pins passing through the narrow channel between the ribs 32, they will engage the lower end of the central trigger 41, pressing it toward the rear, and causing its upper end to move toward the right as viewed in Figures 1, 9, 10, and 11, in this movement wiping against the arm 49 of the ejector so as to move that to the rear. When the ejector reaches the rearmost position, substantially as shown in Figure 9, it will have cleared the well 51 and the washer column will have moved downwardly so as to present a washer on the inclined top face 43 in the slot 47 and across the slot 37 or 38. At this time the pin and trigger will have reached the position substantially as dotted in Figure 9. Immediately thereafter the pin will clear the end of the trigger, relieving the arm 49 of pressure by the trigger, and the spring 50 will then draw the ejector plate 48 rapidly forward, and the ejector will throw the interposed washer into the channel formed by the flanges 65, so that it will move downwardly until stopped by the retainer finger 67 in the position substantially as shown in Figure 1. It will be appreciated that for each pin that passes the trigger a washer will be projected forwardly, and it is possible for several washers to be held by the retainer finger at one time before the first one is removed. As soon as the first pin 81 which has passed the trigger 40 reaches the end of the channel between the ribs 32, the tenon 82 thereof will engage the outermost washer held by the retainer finger 67, and will enter the aperture therein and draw the washer from under the retainer finger as the mold and machine move relatively, the finger 67 yielding and being returned immediately to its retaining position by the spring 68, so that the succeeding washer, if any, is held until another pin similarly engages it, as will be understood.

The function of pins passing through the space between the ribs 31 and 32 is much the same, but in the case of a rubber heel mold there will be certain pins which will move in different paths laterally of the machine, as indicated in Figure 8, where the arrows and dotted lines alined therewith indicate relative movement of the pins with respect to the machine, but not necessarily actual movement of the pins which may be stationary and the machine itself may be moved translatively, so as to produce a similar relative movement. In the case of pins at the extreme outer side of the space within the ribs 31, these will move along under the shoe plate 28, and will engage the head 42 of one of the triggers 40, operating it with the same effect as before described with respect to the trigger 41, and a washer will be projected forwardly and into the guide-way formed by the flanges 65' on the pivoted guide, until stopped by the retaining finger 67'. Here, the washer will be engaged and removed from the machine by the next pin moving in such path.

With respect to pins which move in paths located inwardly of a longitudinal line through the initial position of the outer end of the pivot guide, such pins in passing under the machine will similarly engage the head portion 42 of the respective trigger 40, causing similar operation of the ejector and projecting of a washer into the pivoted guide. After passing the trigger and moving beyond the bed plate 20, the pin which has produced such operation will engage the depending flange 75, and perform a wiper action thereagainst which will swing the pivoted guide inwardly on its pivot as the pin moves longitudinally along the flange 75, and such pin will finally pass longitudinally outwardly into engagement with the washer held at the end of the pivoted guide, and will engage the same and will move it from under the retaining finger 67, as before indicated. After passage of such pin such spring 76 will immediately snap the pivoted guide back to linitial position, where it will be ready to deliver a washer to a succeeding pin, either by further pivotal movement or by engagement of the washer with the pivoted guide in initial position. The pivoted guide 73, like the stationary guide 63, may hold several washers for successive removal by respective pins, as will be readily understood, and in the particular arrangement of pins indicated in Figure 8, a series of washers held by the pivoted guide at one time may be removed by pins moving in different laterally spaced paths, without impairment of the function of the machine.

In Figures 12 to 16, there is illustrated a modification of the invention, in which the construction of the bed plate 21, stationary guide 63' and the washer feeding needle wires, may be very much the same as before described, but the construction of the trigger and ejecting device, and the pivoted guide is modified. Also, the stationary guide is not modified except at its outer end. In this instance, the frame block 26' is formed with a top face which slopes in a direction opposite to that of the slope of the top face of the block 26, and the top block 44' is correspondingly formed, but has wells 51 in substantially the same relative location and position as the wells 51 in the prior structure, and the needle wires 52 extend thereinto with the same function and manner of support as before described.

A spacer plate 43' of substantially the same form as the spacer plate 45, is interposed between the blocks, affording guide-ways for washers as before described. Slidable in each of the guideways there are respective ejector plates 90, each one having two arms 91 extended forwardly and having lateral ears so that at the retracted position of the ejector these ears are just in front of the cap block 44'. The cap block is suitably slotted at the upper part to accommodate contractile springs 92, extended rearwardly and anchored therein, their forward ends being attached to the ears on respective arms 91 of the ejector plates, under tension so as to tend to hold the latter at retracted positions. Fixed rigidly on each ejector plate there is a trigger arm 93, which extends downwardly so as to reciprocate in the slots of the bed plate and shoe, which slots may be of the same form and size as those before described. The central trigger arm 95 is of simple form so as to move in the space between the ribs 32, before described. The lateral triggers, however, are provided with a transverse head 94. The length of the triggers 93 and the inclination of the top of the block 26 are such that when the ejector plate is at the forward limit of its movement, as shown in dotted lines in Figure 13, the lower parts of the triggers including the heads 94, will be located below the bed plate and in position to be engaged by passing pins of a mold or the like, but when the triggers and ejectors plates have been moved to their forward limit, as dotted in Figure 13, and shown in full lines in Figure 16, the upward movement of the ejector plate and triggers will be sufficient to clear them from engaging pins, and permit return of the triggers to initial position by the spring 95 is provided, which will engage ejected of the cap block 44' a guide plate, or thin leaf spring 95 is provided, which will engage ejected washers and guide them downwardly toward the channels in the guide chute devices which will now be described.

The modification bed plate 20' in the present instance is extended much further forward than in the first form of the device, and in addition to the side guide flanges 31' and central ribs 32' has a forward part 96, in which two lateral arcuate slots 97 are formed, and a central smaller longitudinal slot 98 adapted to receive respectively two pivoted guides, and a stationary guide delivery end, as will be described. The frame block 26' is formed with a lower forward extension or shoulder 99 on which stationary and pivoted guides 100 and 101 are pivoted by means of simple bolts 102, as shown. The stationary guide 100 may be substantially of the same form, but is of slightly lesser inclination and extends further to the rear, although this is not material, and it is fixed in place on the shoulder 99 instead of being pivoted. Each of the guide devices, both the stationary and the pivoted ones, include guide flanges 105, a retaining finger 106, and coacting leaf-spring 107, which are substantially the same as the parts 65, 67 and 68, before described. The lower ends of the pivoted guide bodies 101, however, are formed with wing-like wiper flanges or ribs 108 rearwardly diverging toward opposite sides thereof, and located below the bed plate 20', extending rearwardly thereunder a distance, as shown in Figure 13. These wings stop short of each other at the middle of the guide where a slot 103 is formed in the body 101 through which the tenon of a mold pin may pass to engage the washer held on the guide thereover. The lateral extent of the wing ribs 108 is such that with the pivoted guide at a central position, the ribs 108 will include the full width of the path for pins laterally of the ribs 32'. At the end of the stationary guide, knobs 104 are formed on respective sides of a slot 103', the space between which corresponds to the width of the space between the central ribs 32 and the body of the guide being slotted therebetween to afford a clearance for the passage of the tenon of a mold pin to engage a washer held at the end of this guide. The slots 97 are concentric with the pivots of the respective pivoted guides, as may be appreciated, and are of a size and width to permit the movement of the ribs 108 therein without obstruction. The parts of the ribs 108 which are extended beneath the bed plate 20' comprise substantially arms or wings, and the outer arm 108 of each pivoted guide is arranged so that it projects laterally beyond the bed plate when at the adjacent limit of movement of the pivoted guide, as dotted at the left in Figure 12.

In the use of the modified form of the device, the loaded needle wires being positioned as before described and properly loaded, the device is manipulated or operated in the same manner as the first described form of the device, the ejection and placing of the washers being automatic, but being accomplished by a different function which is not as rapid in its movement of the washer. In this case, as a mold pin engages one of the triggers 93, the trigger is moved forwardly, the ejector 90 engaging the edge of the lowermost washer in the adjacent well 51' and projecting the same outwardly and formwardly from the blocks 26' and 44' under the spring guide 95 and over the respective adjacent guide devices 100 or 101, as the case may be. Here, it is free and permitted to move by gravity downwardly along the guide chute device under the flanges 105 until stopped by the retaining finger 106. In the stationary guide the washer is so retained until a pin passing between the ribs 32 engages the washer at the end of the central stationary guide, from which the washer is removed in the same manner as before. The pin engaging such washer will have previously operated the trigger 93 so as to move it rearwardly as before described, discharging the lowermost washer in the respective well into the central guide, and as before, one or more washers may be held in this guide at one time in response to one or more operations of the trigger 93 before the first washer is engaged by the respective pin. In the case of pins passing beneath the machine outwardly of the ribs 32, these first engage one of the trigger heads 94, causing the discharge of a respective washer into the pivoted chute guide at the same side of the machine as the pin which operates the trigger, as will be readily understood. The pivoted guides are preferably spring-engaged in the present instance, and are freely operable so that while each one will tend to remain in a central position, it may be moved by any pin which may pass thereunder. Considering the position of the pivoted guide when arranged longitudinally and parallel to the longitudinal axis of the machine, any pin which moves in line with the slot 103 while in this position will pass freely thereto, engaging the lowermost washer which may happen to be in the guide at this time. Should, however, the pins pass in a line either toward the center line of the machine or outwardly of the slot 103 when in the mentioned initial position, it will engage one of the wing-like diagonal ribs 108, and wiping against the incident edge thereof will cause the pivoted guide to swing until the slot 103 is brought into line with the path of movement of the engaging pin, so that the latter will pass through the slot 103 and remove the lowermost washer thereover as before.

If desired, any conventional spring centering device may be utilized for holding the pivoted guide last described at a medial position extending parallel to the longitudinal axis of the machine. In the present instance, this is represented as a helical torsion spring 110, having two arms 111 which tend to spring toward each other, so that the spring has a generally U-shaped form with the helix in the bight thereof. The helix of the pins is engaged loosely around the stud pin 112 set in the bed plate 20', and the arms of the spring are extended forwardly and engaged outwardly of respective pins 113, the pins being located between the arms and receiving the arms thereagainst as stop members, leaving the arms free to be moved laterally outward in respective directions. Also engaged between the arms and arranged to engage to press alternately against them, is a stud pin 114 set in the underside of the pivoted guide body 101, so that when the guide body is swung in one direction it will engage one of the arms 111, and when swung in the other direction will engage in the other, and when disengaged from a mold pin by which the guide is swung, the spring arm 113 will return it to initial medial position by bearing against the pin 114 until the engaging arm reaches the pin 113 thereadjacent, when its movement will be stopped.

Various other modifications of construction may be made, and it will be understood that while we have described with particularity the two forms of device presented in this application, various modifications in construction, arrangement and combination of parts utilizing equivalent elements may be made without departing from the spirit of the invention, as more particularly pointed out in the appended claims.

While described as a portable machine, it will be understood that the invention will also include the mounting of the device as a permanent part of a complete molding machine.

We claim:

1. A device of the character described comprising a body structure having a washer receiving well therein, a slot being formed in the device extending across the bottom of the well and beyond, an ejector slidable therein across the well, a needle device having a multiplicity of washers threaded thereon and extending into the well stopping short of the path of said ejector, a trigger mounted and constructed to project below the body at one position and movable by a passing point into point-clearing position, yielding means to hold the trigger in initial position, said trigger being operatively associated with the ejector for operation of the ejector, a washer guiding device in washer-receiving relation to said slot, and adapted to permit movement of a washer therethrough by gravity to an extremity of the guiding device, a washer holding means at said extremity yieldable to a washer pressed therefrom, said guiding device being constructed to receive a point therein passing beneath the machine to engage the aperture of a washer at said extremity.

2. The structure of claim 1 in which there is a plurality of said wells, ejectors, triggers, and washer guiding devices, at least one of the washer guiding devices being pivoted adjacent the respective ejector, yielding means to hold the washer guiding device at an initial position, and a wiper means on the washer guiding device adjacent its said extremity positioned to be engaged by a point passing beneath the machine in a relative path varying from the said initial position of the washer guiding device.

3. A washer feeding device consisting of a wire needle device adapted to be threaded through a multiplicity of washers, and having a terminal vertical portion and a spiral upper part extended continuously therefrom.

4. The structure of claim 3 in which the inner termination of said spiral portion of the needle is fixed upon a mounting hub device, and a support separably connected to said hub.

5. An injector device for machines of the character described, consisting of a body structure constructed for relative translative movement over pins upon which washers are to be threaded, a trigger device having a portion projected below the body when in initial position and movable by an engaging point to a point-clearing position, yielding means to hold the trigger in initial position, a reciprocable ejector movable thereover, a washer receiving well device thereover, means to feed washers into the well, said ejector being constructed to engage and eject the lowermost washer in the well on each operation, said trigger and ejector being operatively associated for operation of the ejector by full stroke movement of the trigger, and a guide device in receiving relation to said ejector, terminating in the rear of the trigger in position to hold a washer in the path of a passing pin after the latter has passed the trigger, and means to hold a washer at the extremity of the washer guide yieldable to a point-engaged washer.

6. The structure of claim 5 in which said washer guide is a member pivoted adjacent the trigger, means to hold it yieldingly in an initial position, and a wiper device at the extremity of the washer guide positioned to be engaged by a passing point and being inclined so that the point will move the extremity of the guide into washer-threading relation to the point.

CARLOS HALL.
FERNANDO HALL.